Oct. 15, 1957  H. W. SCHULTZ  2,809,422
METHOD OF MAKING A COMPOSITE ARTICLE
Filed May 21, 1954
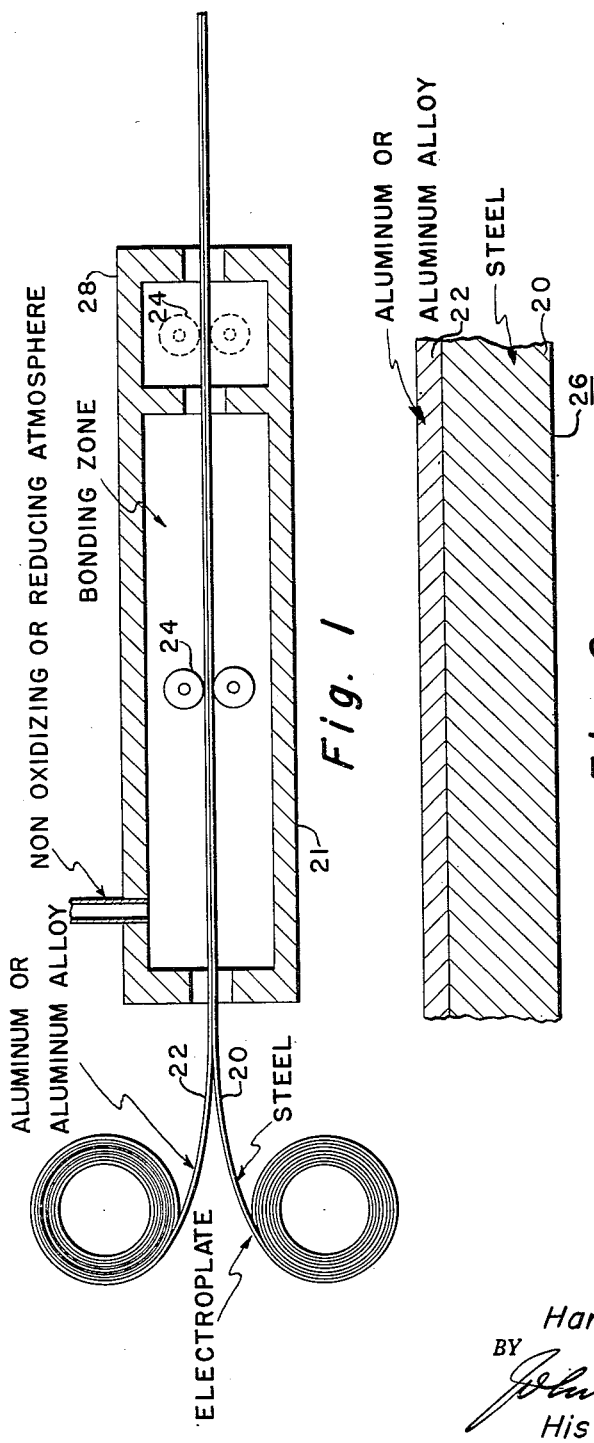
INVENTOR.
Harold W. Schultz
BY
His Attorney

United States Patent Office

2,809,422
Patented Oct. 15, 1957

2,809,422

METHOD OF MAKING A COMPOSITE ARTICLE

Harold W. Schultz, Dayton, Ohio, assignor to General Motors Corporation, Detroit, Mich., a corporation of Delaware Application May 21, 1954, Serial No. 431,516

4 Claims. (Cl. 29—497.5)

This invention relates to composite articles and to a method of making same and is particularly directed to a method for applying a layer of aluminum or aluminum alloy to a supporting metal back, such as steel, wherein the aluminum layer is metallurgically bonded to the metal back.

This application is a continuation-in-part of copending application, Serial No. 100,432, filed June 21, 1949, now abandoned.

It is, therefore, the primary object of the invention to provide a method whereby aluminum and aluminum alloy layers may be metallurgically attached to a stronger metal backing, for example, a steel backing.

In carrying out the above object, it is a further object, in some cases, to provide a continuous method for attaching aluminum or aluminum alloy strip material to a steel strip, or the like, whereby a composite strip is produced wherein the aluminum and the steel are metallurgically bonded coextensively throughout the length of the strip.

A further object of the invention is to provide a method for bonding aluminum or aluminum alloys to steel, or the like, wherein the two metals are heated to a selected temperature under controlled atmospheric conditions and are then rolled together for markedly reducing the thickness of the aluminum layer and for metallurgically bonding the coextensive surfaces of the two layers.

In carrying out the above objects, it is a further object to provide a controlled very thin layer of copper plate upon the surface of the steel and to suitably clean the surface of the aluminum to aid in the bonding operation.

Another object of the invention is to provide a method for making precision-like composite stock of aluminum and steel whereby the aluminum is bonded to the steel without appreciably changing the thickness of the steel during the bonding operation.

Further objects and advantages of the present invention will be apparent from the following description and attached drawing, wherein a diagrammatic view of the bonding equipment is shown in Fig. 1, together with a cross-section of the composite stock in Fig. 2.

In my Patent No. 2,490,548, I show a method for bonding aluminum strip stock to steel and the like wherein the steel is knurled and the knurls are then flattened at the peaks thereof to provide reentrant angles thereunder. Aluminum is compressed into the crevices between the knurls and is thereby mechanically locked to the steel and through heat treatment is metallurgically bonded thereto. This invention is directed to another method for making composite aluminum on steel stock and the like wherein the aforementioned knurling operation is eliminated and electroplating is used to prepare the bonding surface.

I have found that satisfactory and coextensive metallurgical bonds may be produced between the aluminum or aluminum alloys and steel or other suitable strong metal backing plates or strips through the use of selected temperatures during the metallurgical bonding process, which bonding process is aided by a flash of cooperplate upon the bonding surface of the strong metal backing. When the aluminum and the strong metal backing are superimposed and rolled at a predetermined temperature, the electroplate aids in creating a coextensive bond at the juxtaposed surfaces of the two layers.

In a preferred embodiment, the steel 20 or other strong metal backing, is electroplated with a continuous layer of copper which has a thickness in the order of .00002 inch or less. In fact, I have found that an extremely thin layer of copper plate is particularly desirable. This copper plated steel strip is then fed into a controlled atmosphere furnace 21 and aluminum or aluminum alloy strip 22 is likewise fed into the furnace and positioned adjacent the steel strip 20. The two strips 20 and 22 move through the furnace 21 and are heated to a selected and critical temperature whereupon the strips are superimposed and rolled together by means of rolls 24 either positioned in the furnace or at the entrance to the cooling chamber, whereby the strips are rolled together at a desired and critical temperature. The rolling feature is an important part of my invention since it causes an actual flow of the aluminum which improves the bonding characteristics thereof. After rolling, the composite strip 26 may be immediately cooled in a cooling zone 28 and a satisfactory coextensive metallurgical bond will be found to exist between the aluminum and the backing metal. The copper plate appears to have substantially disappeared according to metallographic examination of a cross-section of the stock.

The rolling step is quite drastic in that the aluminum stock is reduced markedly from its original thickness which means that the two strips 20 and 22 are pressed together with considerable force, for example, when a 70% reduction in thickness of the aluminum is used and the aluminum is in the order of .0375 inch thick prior to the rolling operation, the final strip will have an aluminum layer with a thickness of about .0113 inch, etc.

I have found that a minimum of 65% reduction in thickness of the aluminum at a temperature of about 1010° F. will yield a bond. It is apparent that as the rolling pressures increase (higher percent reduction in thickness) the temperature may be reduced. Thus 65% provides uniformly good bonds in production, and reductions up to 80% have been used with good results.

The temperature control of the operation is also a critical factor in the success of the bonding step. It is a known fact that aluminum and iron, and aluminum alloys and iron alloys, form a very brittle iron-aluminum alloy at a point of contact, which alloy is not conducive to further operations on the stock due to its brittle nature. Any appreciable thickness of this interlayer of brittle iron-aluminum alloy is not desirable when the stock is to be subsequently formed into semi-cylindrical bearings and the like, therefore, reduction of this interlayer to submicroscopic thickness is a primary object in manufacture of the composite stock. I have found that the interlayer may be reduced so that it is not apparent in routine metallographic examinations so that the stock is readily bendable without any tendency to crank at the bond if the temperature of the bonding operation is closely controlled. A temperature between 800° F. and 1010° F. is a satisfactory range for the bonding operation with 900–950° F. at 70% reduction, etc. As the temperature goes down, the reduction in thickness must increase if the bond is to be coextensive. As the temperature exceeds 1010° F., the brittle interlayer becomes increasingly apparent. Broadly the pressure varies inversely with the temperature with high limit of 1010° F. for temperature and at low limit at this temperature of 65% reduction in thickness of the aluminum. In all cases, the rolling does not appreciably change the thickness of the steel. It is to be understood that when bonding aluminum and aluminum alloys to steel or other iron alloys that will form a brittle alloy with aluminum, the high temperature noted herein (1010° F.) must not be exceeded.

It is to be understood that in the claims which follow, the term aluminum strip or member is of sufficient scope to embrace pure aluminum or usual aluminum bearing alloys predominating in aluminum, for example, alloys as disclosed in Schluchter Patent No. 2,238,399.

While the embodiments of the present invention as herein disclosed, constitute preferred forms, it is to be understood that other forms might be adopted.

What is claimed is as follows:

1. In a method for making composite articles adapted to be subsequently formed into semicylindrical bearings and the like, the steps of; providing a steel backing member, plating one surface of said backing member with copper in a thickness of not more than .00002", providing an aluminum member to be subsequently bonded to said strong metal backing, heating the backing member and the aluminum member under non-oxidizing conditions to a temperature of between 800° F. and 1010° F., then rolling the heated aluminum member upon the plated surface of the steel under pressures sufficient to cause the aluminum member only to be reduced in thickness to from 65% to 80% according to the temperature for completely diffusing the copper and for simultaneously metallurgically directly bonding the aluminum member coextensively to the backing member wherein the bond is free from a brittle iron-aluminum interlayer without appreciably changing the thickness of the steel, and finally cooling the composite article so formed.

2. In a method of continuously making composite strip stock adapted to be subsequently formed into semicylindrical bearings and the like, the steps comprising; continuously supplying steel strip stock having one surface thereof plated with a very thin flash of copper in the order of not to exceed .00002", continuously supplying aluminum strip adjacent the copper plated side of said steel strip, progressively heating said two strips in a non-oxidizing atmosphere for a time sufficient to cause the strips to attain a temperature of between 800° F. and 1010° F., then rolling the heated aluminum under substantial pressure onto the plated surface of said steel strip to cause the aluminum only to be progressively reduced in thickness from 65% to 80% of its original thickness for completely diffusing the copper and simultaneously metallurgically directly bonding and aluminum coextensively to the steel strip wherein the bond is free from a brittle iron-aluminum interlayer without appreciably changing the thickness of the steel strip, and finally cooling the composite strip so formed.

3. In a method of making composite articles adapted to be subsequently formed into semicylindrical bearings and the like, the steps of; plating one surface of a steel member with copper wherein the plate does not exceed a thickness of .00002", providing an aluminum member to be subsequently bonded to said copper plated surface of the steel member, heating the steel member and the aluminum member under suitable atmospheric conditions to temperatures ranging between 800° F. and 1010° F., rolling the heated aluminum member onto the plated surface of the steel member under pressures sufficient to cause the aluminum member only to be reduced in thickness to form 80% to 65% according to the temperature whereby the copper plate substantially disappears and the aluminum member is coextensively metallurgically directly bonded to the steel backing member with a bond free from a brittle iron-aluminum interlayer, and finally cooling the composite article so formed.

4. In a method for making composite articles adapted to be subsequently formed into semicylindrical bearings and the like, the steps of; providing a steel backing member, plating one surface of said backing member with copper in a thickness not exceeding .00002", providing an aluminum member to be subsequently bonded to said backing member at the plated side thereof, heating and rolling said aluminum member and said backing member together under suitable atmospheric conditions and at temperatures ranging from 800° F. to 1010° F. and at rolling pressures inversely proportional to said temperatures and sufficient to cause a reduction in thickness of said aluminum member only ranging from 80% to 65% of its original thickness, for causing the aluminum member to be metallurgically directly bonded coextensively to the backing member without the formation of a brittle iron aluminum interlayer and simultaneously causing complete diffusion of the copper, and finally cooling the composite article so formed.

References Cited in the file of this patent

UNITED STATES PATENTS

| Number | Name | Date |
|---|---|---|
| 909,924 | Monnot | Jan. 19, 1909 |
| 929,778 | Monnot | Aug. 3, 1909 |
| 1,792,377 | Jordan | Dec. 6, 1949 |
| 2,490,543 | Robertson et al. | Dec. 6, 1949 |
| 2,490,548 | Schultz | Dec. 6, 1949 |
| 2,490,549 | Schultz | Dec. 6, 1949 |
| 2,539,247 | Hensel | Jan. 23, 1951 |
| 2,674,789 | Frost | Apr. 13, 1954 |

FOREIGN PATENTS

| Number | Country | Date |
|---|---|---|
| 520,365 | Great Britain | Apr. 22, 1940 |
| 545,023 | Great Britain | May 7, 1942 |
| 628,198 | Great Britain | Aug. 24, 1949 |